United States Patent
Lee et al.

(10) Patent No.: US 10,578,780 B2
(45) Date of Patent: Mar. 3, 2020

(54) TRANSPARENT PANEL AND DISPLAY SYSTEM THEREOF

(71) Applicants: Samsung Electronics Co., Ltd., Suwon-si, Gyeonggi-do (KR); Seoul National University R&DB Foundation, Seoul (KR)

(72) Inventors: Young-yoon Lee, Suwon-si (KR); Jonghyun Kim, Seoul (KR); Byoungho Lee, Seoul (KR); Jong-Young Hong, Seoul (KR); Seokil Moon, Seoul (KR); Chanhyung Yoo, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 16/122,012

(22) Filed: Sep. 5, 2018

(65) Prior Publication Data
US 2019/0079218 A1 Mar. 14, 2019

(30) Foreign Application Priority Data
Sep. 8, 2017 (KR) .................. 10-2017-0115200

(51) Int. Cl.
*G02B 5/02* (2006.01)
*G02B 27/28* (2006.01)
(Continued)

(52) U.S. Cl.
CPC .......... *G02B 5/0205* (2013.01); *G02B 5/0215* (2013.01); *G02B 3/005* (2013.01);
(Continued)

(58) Field of Classification Search
CPC ..... G02B 5/0205; G02B 3/005; G02B 27/286
(Continued)

(56) References Cited

U.S. PATENT DOCUMENTS

2005/0174516 A1 8/2005 Yee et al.
2016/0139497 A1* 5/2016 Usukura .............. G03B 21/602
353/20

FOREIGN PATENT DOCUMENTS

JP 3786634 B2 6/2006
JP 2007-041218 A 2/2007
(Continued)

OTHER PUBLICATIONS

Takaki et al.; Super multi-view windshield display for long-distance image information presentation; Optics Express; vol. 19; No. 2; Jan. 5, 2011.
(Continued)

*Primary Examiner* — Jerry L Brooks
(74) *Attorney, Agent, or Firm* — Jefferson IP Law, LLP (57) ABSTRACT

A transparent panel is provided. The transparent panel includes a polarization plate, a transparent diffusion plate which is disposed on one side of the polarization plate and is configured to transmit light incident from a side of the polarization plate and to reflect and diffuse a light incident from an opposite side of the polarization plate, a ¼ wavelength plate which is disposed on one side of the transparent diffusion plate and is configured to convert a polarization direction of an incident light, and a lens part which is disposed on one side of the ¼ wavelength plate. The lens part includes a lens array comprising a birefringent material having different refractive indexes according to a polarization direction of an incident light, and a refractive index alignment member configured to transmit or refract the light according to a polarization direction of a light that penetrates the lens array.

9 Claims, 9 Drawing Sheets

(51) Int. Cl.
*G02B 3/00* (2006.01)
*G02B 5/30* (2006.01)
*G02B 27/01* (2006.01)

(52) U.S. Cl.
CPC ............ *G02B 5/3083* (2013.01); *G02B 27/01* (2013.01); *G02B 27/286* (2013.01)

(58) Field of Classification Search
USPC .......................................................... 353/20
See application file for complete search history.

(56) References Cited

FOREIGN PATENT DOCUMENTS

| | | |
|---|---|---|
| JP | 4967409 B2 | 7/2012 |
| KR | 10-0741772 B1 | 7/2007 |
| KR | 10-0950628 B1 | 4/2010 |
| KR | 10-1332024 B1 | 11/2013 |

OTHER PUBLICATIONS

Hong et al.; See-through multi-projection three-dimensional display using transparent anisotropic diffuser; Optics Express; vol. 24; No. 13; Jun. 15, 2016.

\* cited by examiner

TRANSPARENT PANEL AND DISPLAY SYSTEM THEREOF

CROSS-REFERENCE TO RELATED APPLICATION

This application is based on and claims priority under 35 U.S.C. § 119(a) of a Korean Patent Application number 10-2017-0115200, filed on Sep. 8, 2017, in the Korean Intellectual Property Office, and the disclosure of which is incorporated by reference herein in its entirety.

BACKGROUND

1. Field

The disclosure relates to a transparent panel and a display system.

2. Description of Related Art

Advancement in the electronic technology has introduced use of a variety of display apparatuses in many fields. And, increasing number of studies and discussions are being focused on the next-generation display apparatus such as transparent display apparatus.

A transparent display apparatus herein refers to a display apparatus with transparency property to allow one to see the back of the apparatus therethrough. Conventionally, a non-transparent semiconductor compound such as silicon (Si) or gallium arsenide (GaAs) etc. was used to fabricate a display panel. However, as demands for various display services have appeared beyond the ability of the existent display panels, efforts continue to develop new forms of electronic devices conforming to those demands. The transparent display apparatus is one of the outcomes obtained by these efforts.

One type of transparent display apparatus is a projection type display apparatus. The projection type display apparatus is an apparatus which projects an image onto a transparent panel and allows a user to view the image on the transparent apparatus. However, to implement a projection type apparatus, it is necessary to secure an optical distance of at least a predetermined size between a transparent panel and an image projection apparatus. Accordingly, there is a problem that a volume of system is increased.

In addition, in a case of a related-art transparent display apparatus, an image projected onto a transparent panel is not diffused well and is reflected and thus, the user recognizability is deteriorated.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a transparent panel which is capable of effectively displaying an image even if the image is projected at a near distance and a display system including the same.

In accordance with an aspect of the disclosure, a transparent panel is provided. The transparent panel includes a polarization plate, a transparent diffusion plate which is disposed on one side of the polarization plate and is configured to transmit light incident from a side of the polarization plate and to reflect and diffuse a light incident from an opposite side of the polarization plate, a ¼ wavelength plate which is disposed on one side of the transparent diffusion plate and is configured to convert a polarization direction of an incident light, and a lens part which is disposed on one side of the ¼ wavelength plate. The lens part may include a lens array comprising a birefringent material having different refractive indexes according to a polarization direction of an incident light, and a refractive index alignment member configured to transmit or refract the light according to a polarization direction of a light that penetrates the lens array. The lens array may include a lens array of birefringent materials having different refractive indexes according to a polarization direction of a projected light, and a refractive index alignment member configured to transmit or refract a light according to a polarization direction of a light that penetrates the lens array.

The lens array may be a lenticular lens array. The refractive index alignment member may be configured to include a material having a same refractive index as one of a plurality of refractive indexes of the birefringent material, and to cover the lens array.

The polarization plate may be configured to convert a light incident to the polarization plate to a first polarized light. The transparent diffusion plate may be configured to control the first polarized light to transmit the ¼ wavelength plate. The ¼ wavelength plate may be configured to rotate a polarization direction of the first polarized light by 45 degrees and convert the first polarized light to a second polarized light. The lens part may be configured to transmit the second polarized light transferred from the ¼ wavelength plate. The lens part may be configured to, based on an image of a same polarization direction as the second polarized light being incident from an external projector, control the image to transmit the ¼ wavelength plate. The ¼ wavelength plate may be configured to rotate a polarization direction of the image by 45 degrees and transmit the image to the transparent diffusion plate. The transparent diffusion plate may be configured to reflect the image to the ¼ wavelength plate. The ¼ wavelength plate may be configured to rotate a polarization direction of the reflected image by 45 degrees again and convert a polarization direction of the image to a perpendicular polarization direction to the second polarized light. The lens part may refract an image of a perpendicular polarization direction to the second polarized light.

The transparent diffusion plate may include an optical element of a first refractive index, a metal layer of a second refractive index and disposed on one side of the optical layer, and a refractive index alignment device of the first refractive index and covering the metal layer. The metal layer may be thinner than the optical element and the refractive index alignment device.

In accordance with another aspect of the disclosure, a display system is provided. The display system includes a transparent panel and a projector configured to project an image to a direction of a first surface of the transparent panel. The transparent panel may be configured to convert each of polarization directions of a light incident in a direction of a second surface opposite to the first surface and the image, and to transmit a light incident to a direction of the second surface and reflect and diffuse the image.

The transparent panel may include a polarization plate, a transparent diffusion plate which is disposed on one side of the polarization plate, and is configured to transmit a light incident from a side of the polarization plate and reflect and diffuse a light projected from an opposite side, a ¼ wavelength plate which is disposed on one side of the transparent diffusion plate and is configured to convert a polarization direction of an incident light, and a lens part which is disposed on one side of the ¼ wavelength plate. The lens part may include a lens array including a birefringent material having different refractive indexes according to a polarization direction of an incident light, and a refractive index alignment member configured to transmit or refract the light according to a polarization direction of a light that penetrates the lens array.

The lens array may be a lenticular lens array. The refractive index alignment member may be configured to include a material having a same refractive index as one of a plurality of refractive indexes of the birefringent material, and to cover the lens array.

The polarization plate may be configured to convert a light incident to the polarization plate to a first polarized light. The transparent diffusion plate may be configured to control the first polarized light to transmit the ¼ wavelength plate. The ¼ wavelength plate may be configured to rotate a polarization direction of the first polarized light by 45 degrees and convert the first polarized light to a second polarized light. The lens part may be configured to transmit the second polarized light transferred from the ¼ wavelength plate. The lens part may be configured to, based on an image of a same polarization direction as the second polarized light being incident from an external projector, control the image to transmit the ¼ wavelength plate. The ¼ wavelength plate may be configured to rotate a polarization direction of the image by 45 degrees and transmit the image to the transparent diffusion plate. The transparent diffusion plate may be configured to reflect the image to the ¼ wavelength plate. The ¼ wavelength plate may be configured to rotate a polarization direction of the reflected image by 45 degrees again and convert a polarization direction of the image to a perpendicular polarization direction to the second polarized light. The lens part may refract an image of a perpendicular polarization direction to the second polarized light.

The projector may include an image projection part configured to project the image, and a polarizer configured to convert the projected light to a second polarized light.

The transparent diffusion plate may include an optical element of a first refractive index, a metal layer of a second refractive index and disposed on one side of the optical layer, and a refractive index alignment device of the first refractive index and covering the metal layer. The metal layer may be thinner than the optical element and the refractive index alignment device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, and advantages of certain embodiments of the disclosure will be more apparent from the following description taken in conjunction with the accompanying drawings, in which.

The same reference numerals are used to represent the same elements throughout the drawings.

DETAILED DESCRIPTION

Hereinafter, example embodiments of the present disclosure will be described in detail with reference to the accompanying drawings. Also, well-known functions or constructions are not described in detail since they would obscure the disclosure with unnecessary detail. In addition, the exemplary embodiments may be changed in various forms, and therefore, the technical scope is not limited to the following exemplary embodiments. Rather, these exemplary embodiments are provided to make the present disclosure thorough and complete.

Unless explicitly described otherwise, the term 'including' will be understood to imply the inclusion of a component, but not the exclusion of any other components. Further, various elements and areas in the drawings are schematically drawn. Therefore, the technical ideas are not limited by a relative size or interval drawn in the accompanying drawings.

Figure 1:
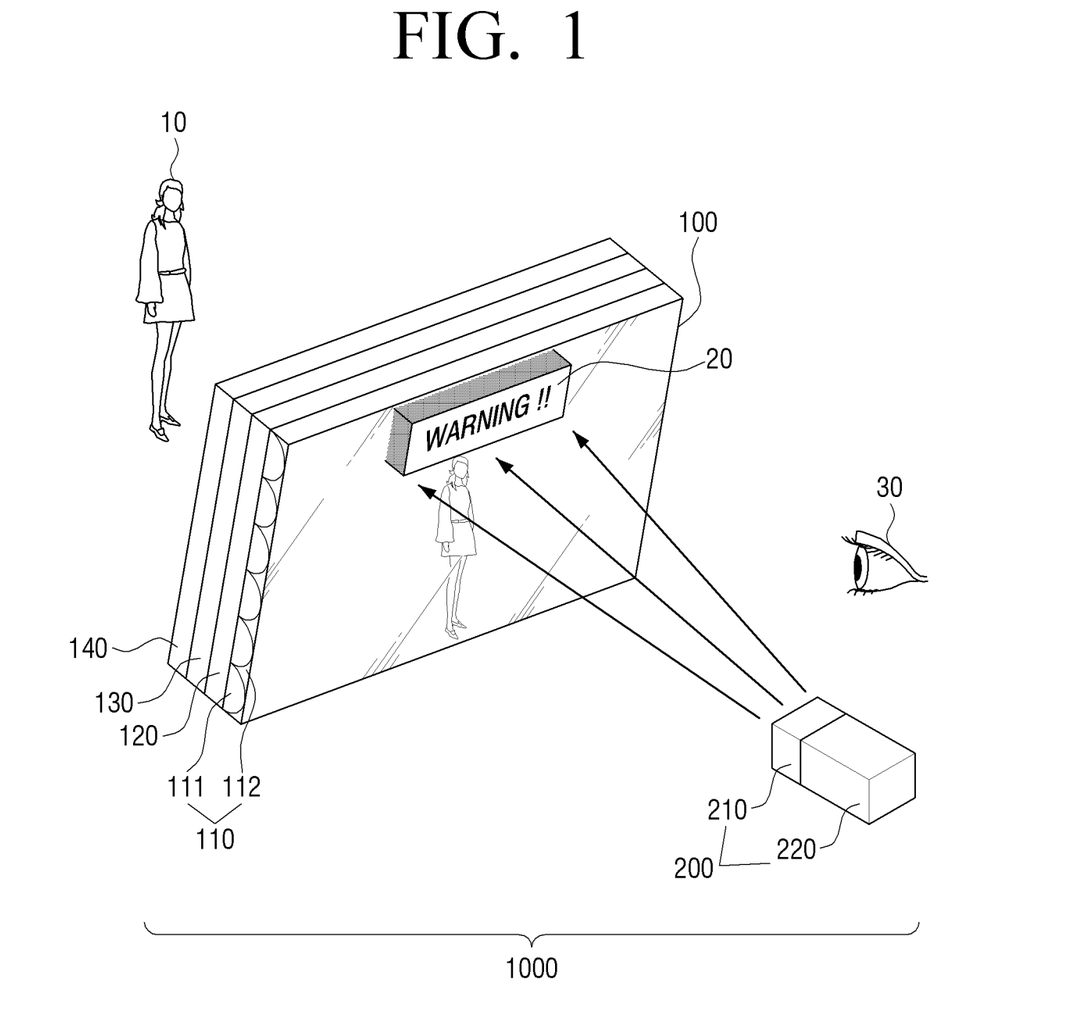
FIG. 1 is a diagram illustrating an operation of a display system, according to an example embodiment.

FIG. 1 is a configuration of a display system, according to an example embodiment.

A display system 1000 of FIG. 1 may be applicable to a head up display (HUD), a TV, a monitor, a mobile phone, a personal digital assistant (PDA), a PC, an electronic frame, a kiosk, a show window, etc.

According to FIG. 1, the display system may include a transparent panel 100 and a projector 200. The display system allows a user 30 to experience augmented reality by simultaneously observing an image 20 and an object 10 positioned on the rear side of the transparent panel 100.

The transparent panel 100 may reflect and diffuse an image projected from the projector 200 and allow an incident light entered from the external object to pass through the transparent panel 100.

The transparent panel 100 may include a lens part 110, a ¼ wavelength plate 120, a transparent diffusion plate 130, and a polarization plate 140. The lens part 110 may include a lens array 111, and a refractive index alignment member 112. Specific configurations and operations of the transparent panel 100 will be described again below in detail.

The projector 200 is a configuration for projecting an image onto the transparent panel 100. The projector 200 may include a polarizer 210 and an image projection part 220.

The image projection part 220 is a configuration for projecting an image. The image projection part 220 may include an input/output interface which is connected to a source providing an image, a light source emitting a light, an optical device for projecting light, etc. For example, various types of images such as a single-view image, a stereo image, a multi-view image, and the like may be output. Specific configurations and operations of the image projection part 220 is well-known in the art and thus, the detailed descriptions thereof will be omitted.

The polarizer 210 may polarize an image projected from the image projection part 220. A polarized image may be diffused by the transparent panel 100. In FIG. 1, the polarizer 210 and the image projection part 220 are integrally formed, but the example is not limited thereto.

The polarizer 210 may be included on a front surface of the image projection part 220. The polarizer 210 may polarize a polarized light of an image projected from the image polarization part 220 to a predetermined direction. When the projected image is polarized, the projected image may directly pass through the lens part 110 before being reflected and diffused, and may be refracted on the lens part 110 and transferred to the user 30 after being reflected and diffused from the transparent diffusion plate 130, According to the example embodiment of FIG. 1, a projection type display system may be implemented without using a half-mirror and a diffusion plate. Accordingly, unlike related-art projection type display system, it is not necessary to secure an optical distance and thus, it is possible to reduce a system volume.

In addition, a fill factor may be increased by a diffusion phenomenon of the transparent diffusion plate 130. If the fill factor is improved, an intensity of radiation is increased in a light distribution degradation area caused by an interval between a plurality of viewable pixels. Accordingly, the recognizability for a projected image may be increased.

Figure 2:
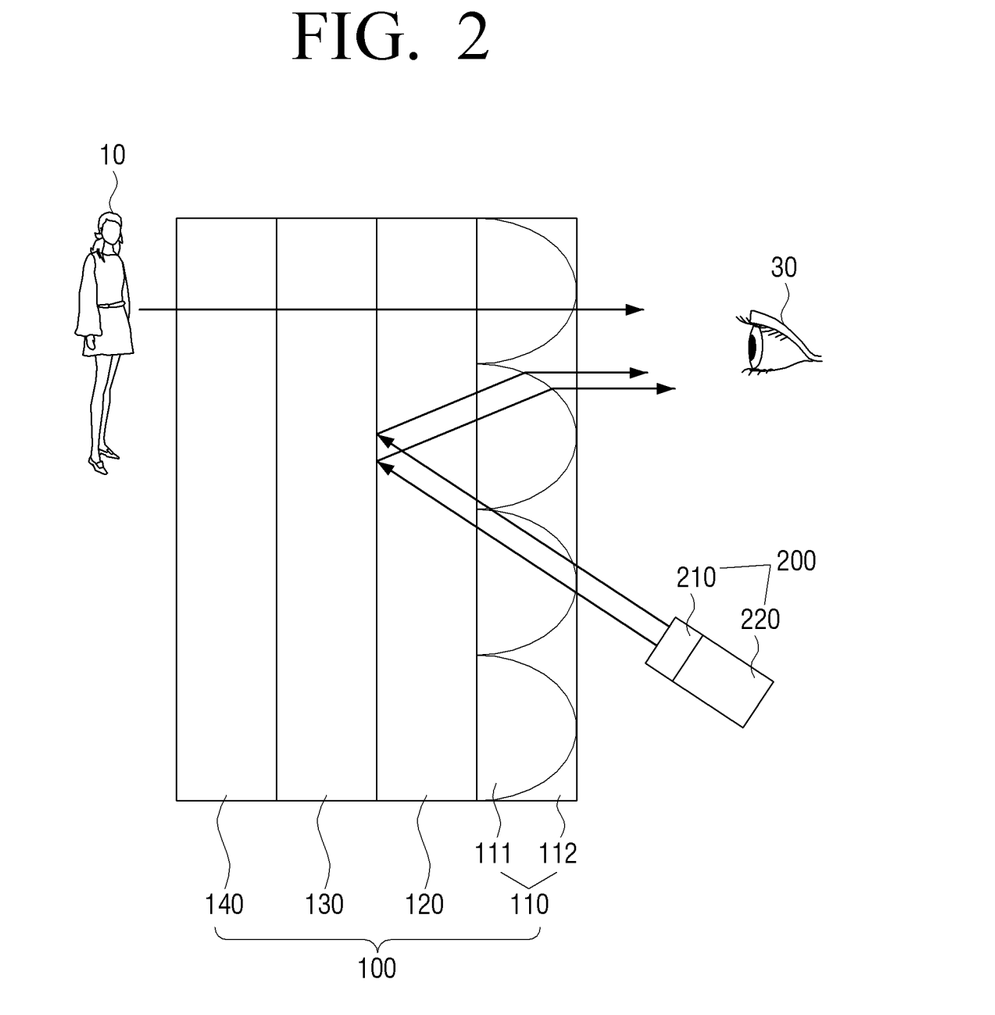
FIG. 2 is a diagram illustrating a configuration of a transparent panel, according to an example embodiment.

FIG. 2 is a diagram illustrating a configuration and operation of a transparent panel, according to an example embodiment.

According to FIG. 2, a light reflected from an external object 10 is incident to one side of a transparent panel 100, and a light projected from a projector 200 is incident to the other side.

The transparent panel 100 may include a lens part 110, a ¼ wavelength plate 120, a transparent diffusion plate 130, and a polarization plate 140.

The polarization plate 140 may serve to convert an incident light to a particular polarized light. A polarization direction may be arbitrarily set, but will be referred to as a first polarized light for the convenience of explanation. A light reflected from the external object 10 and incident to the transparent panel 100 may be changed to a first polarized light while going through the polarization plate 140, and the first polarized light may be transferred to the transparent diffusion plate 130.

The transparent diffusion plate 130 may be a transparent diffusion plate having a characteristic of transmitting light projected from one side and reflecting and diffusing light projected from the opposite side. FIG. 2 illustrates a state in which a transparent diffusion plate 130 is disposed to transmit a light projected from a side of the polarization plate 140. Accordingly, the first polarized light may transmit the transparent diffusion plate 130 and may be incident to a ¼ wavelength plate 120.

The ¼ wavelength plate 120 may convert a polarization direction of light by optical properties. For example, the polarization direction may be rotated by +45 degrees or −45 degrees. Accordingly, a light incident to the ¼ wavelength plate 120 may be converted to a second polarization direction which is rotated by 45 degrees from a first polarization direction. For example, the second polarization direction may be identical to a p polarization direction.

The lens part 110 may include a lens array 111, and a refractive index alignment member 112.

The lens array 111 may be implemented as a lenticular lens array including a plurality of lens areas. A lenticular lens array may refract a projected image. Each lens area may be formed in a size corresponding to at least one pixel.

The lens array 111 may include birefringent materials. A birefringent material may refer to a material having different refractive indexes according to a polarization direction of light. The birefringent material may include an optical anisotropy material or a crystal other than equi-axied crystal, which may be, representatively, calcite, crystal, etc. However, the birefringent material is not limited to the examples shown above, and may include all materials in which a birefringent having different refractive indexes according to a polarization direction is caused.

The refractive index alignment member 112 may include materials having the same refractive index as one of a plurality of refractive indexes of a birefringent material of the lens array 111. For example, it is assumed that a birefringent material has a refractive index of np when a p-polarization is incident, and that a birefringent material has a refractive index of ns when an s-polarization is incident. The refractive index alignment member 112 may be implemented as a material having a refractive index of np which is a refractive index of a birefringent material when the p-polarization is incident. In addition, the refractive index alignment member 112 may be of a form that covers the lens array 111.

A detailed description of the lens part 110 will be described in detail with reference to FIGS. 3A and 3B.

Figure 3A:
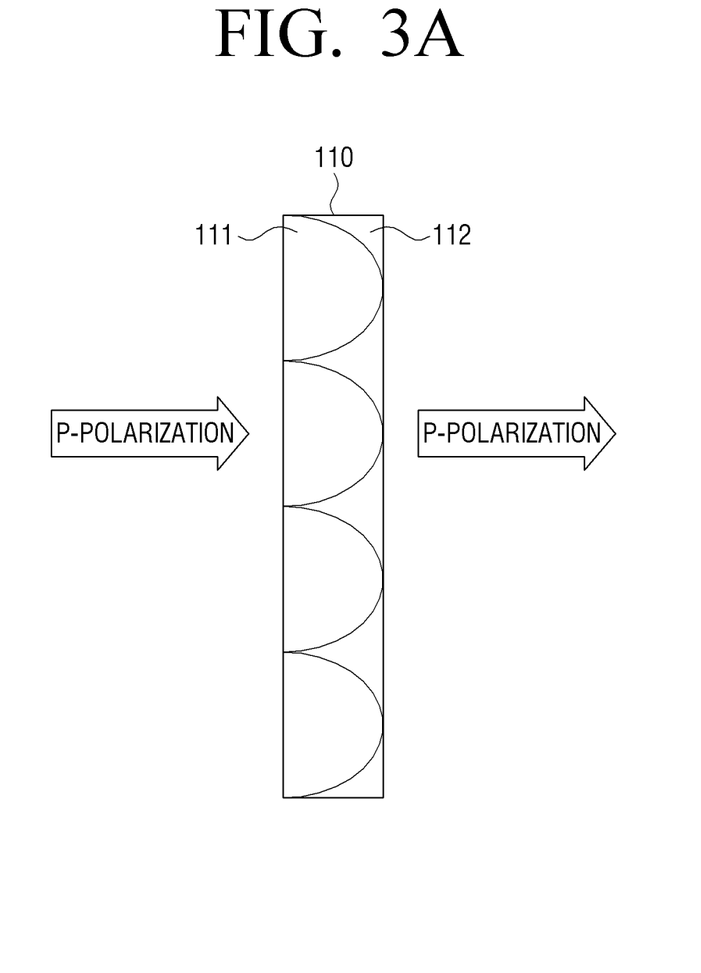
FIGS. 3A and 3B are diagrams illustrating an operation of a lens part, according to various example embodiments.

In a case in which an incident light is a p-polarization as illustrated in FIG. 3A, both a lens array 111 and a refractive index alignment member 112 have a refractive index of np and thus, the incident light may be transmitted without being refracted in the lens part.

Figure 3B:
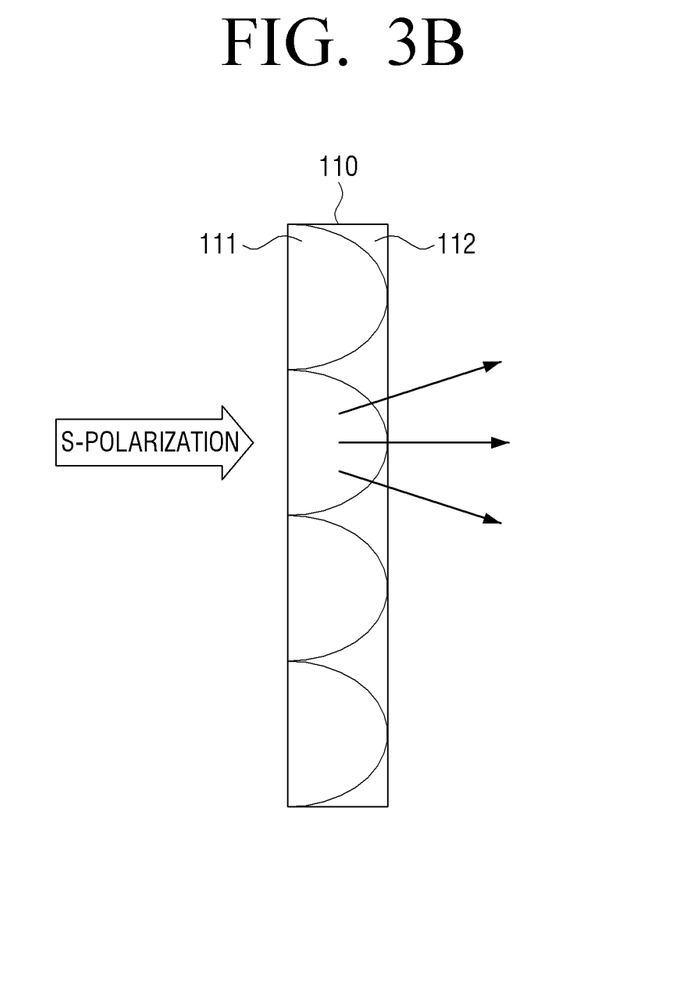

In a case in which an incident light is a s-polarization as illustrated in FIG. 3B, a refractive index of the lens array 111 may have a refractive index of ns and a refractive index of the refractive index alignment member 112 may have a refractive index of np. Accordingly, a light incident from the lens array 111 to the refractive index alignment member 112 may be refracted and form a multi-view image.

FIGS. 3A and 3B illustrate a p-polarization and an s-polarization. However, the example is not limited thereto, and the polarized light may be designed to be used for incident light having a polarization direction difference of 90 degrees. That is, when a second polarized light is transferred from a ¼ wavelength plate 120, it may be designed such that the refractive index alignment member 112 has a refractive index corresponding to the second polarized light. In this case, the second polarized light may be directly transmitted, and may be refracted when a polarized light having a polarization direction perpendicular to the second polarized light is incident.

As described above, when a light reflected from an external object 10 is converted to a second polarized light while going through the polarization plate 140, the transparent diffusion plate 130 and the ¼ wavelength plate 120 and transferred to the lens part 110, the lens part 110 may directly transmit the second polarized light. Accordingly, the user may recognize the external object 10 as it is.

Meanwhile, a light transmitted from the projector 200 may be incident to the transparent panel 110.

The light projected from the image projection part 220 of the projector 200 may be converted to the second polarized light while going through the polarizer 210. Since the light is the second polarized light, the light may penetrate the lens part 110.

Thereafter, a polarization direction of the second polarized light may be rotated 45 degrees as the second polarized light goes through the ¼ wavelength plate 120. For convenience of explanation, a state in which the second polarized is rotated 45 degrees may be referred to as a third polarized light.

The third polarized light converted on the ¼ wavelength plate 120 may be incident to the transparent diffusion plate 130. As described above, the transparent diffusion plate 130 may reflect and diffuse a light incident from a projector direction.

Accordingly, the reflected and diffused third polarized light may go through the ¼ wavelength plate 120 again and a polarization direction may be rotated 45 degrees again. As a result, a conversion may be made to a fourth polarized light in which a polarization direction of the third polarized light is rotated 45 degrees. If it is designed as p-polarization and s-polarization, the second polarized light may be p-polarization and the fourth polarized light may be s-polarization.

When the fourth polarized light is incident to the lens part 110, the lens array 111 including birefringent materials may have a refractive index of ns corresponding to a polarized light in a perpendicular direction to the second polarized light. Accordingly, the fourth polarized light is refracted as it goes through a refractive index alignment member 112 having a refractive index np different from the refractive index ns.

As a result, a light incident from the projector 200 may be refracted in the lens part 100 as the light is reflected and diffused from the transparent diffusion plate 130. Due to the occurrence of diffusion, the user recognizability may be improved.

Figure 4:
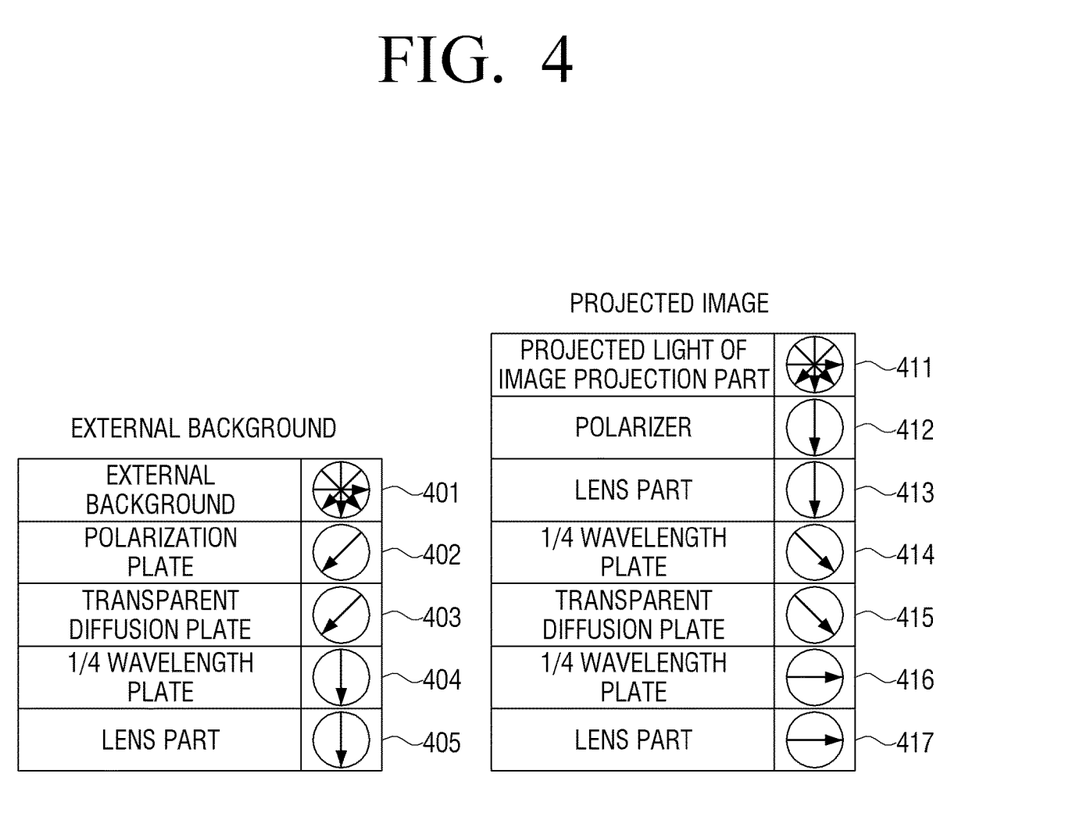
FIG. 4 is a diagram illustrating a change of polarization direction of an image on a transparent panel, according to an example embodiment.

FIG. 4 is a table showing a conversion of a polarization direction of a light incident from both sides of a transparent panel.

The left row of FIG. 4 indicates a polarization change process of a light incident from an external background disposed outside a transparent panel.

Referring to FIG. 4, a light 401 incident from an external background may be polarized to a first polarized light 402 by the polarization plate 140, and then, polarized to a second polarized light 404 as a polarization direction is rotated by 45 degrees on the ¼ wavelength plate 130. A light polarized to a second polarization direction may directly transmit 405 the lens part 110.

The right row of FIG. 4 is provided to explain a process in which an image projected from the projector 200 is reflected and diffused on the transparent panel 100 and reaches a user 30.

Referring to FIG. 4, a projected light 411 of a projector is changed to the second polarized light 412 via a polarizer and directly penetrates the lens part 110. Thereafter, a polarization direction of the projected light 411 of the projector may be rotated 414 by 45 degrees via the ¼ wavelength plate 120 and reflected on the transparent diffusion plate 130. The reflected light 411 may go through the ¼ wavelength plate 120 again and a polarization direction may be rotated 416 again by 45 degrees. As a result, the light 411 may become a fourth polarized light 416 and may be refracted 417 by the lens part 110.

Meanwhile, the p-polarization and s-polarization described above are not limited to the corresponding polarized light, and may be all polarized lights that differ in polarization direction by 90 degrees. Unlike the example described above, the ¼ wavelength plate may rotate a polarization direction by −45 degrees.

Figure 5A:
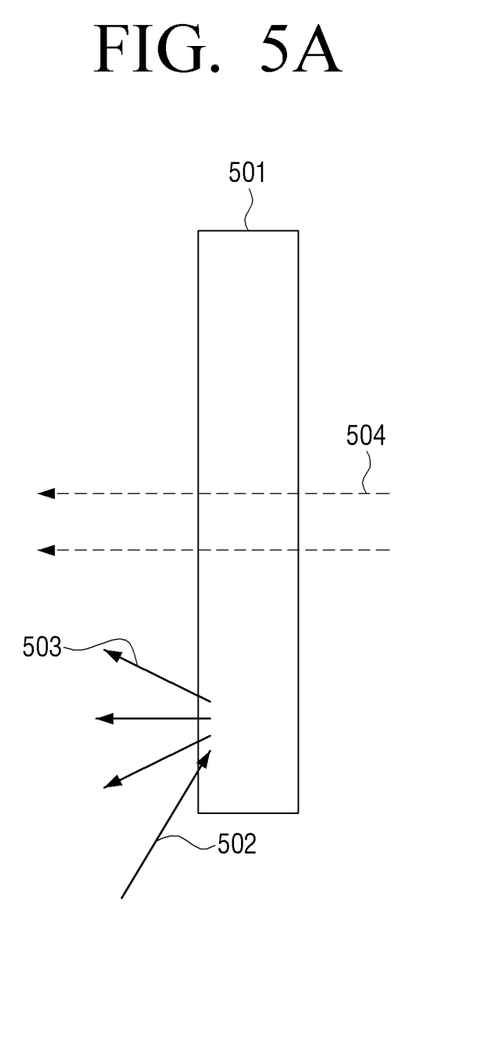
FIGS. 5A and 5B are diagrams illustrating an operation of a transparent diffusion plate, according to various example embodiments.
Figure 5B:
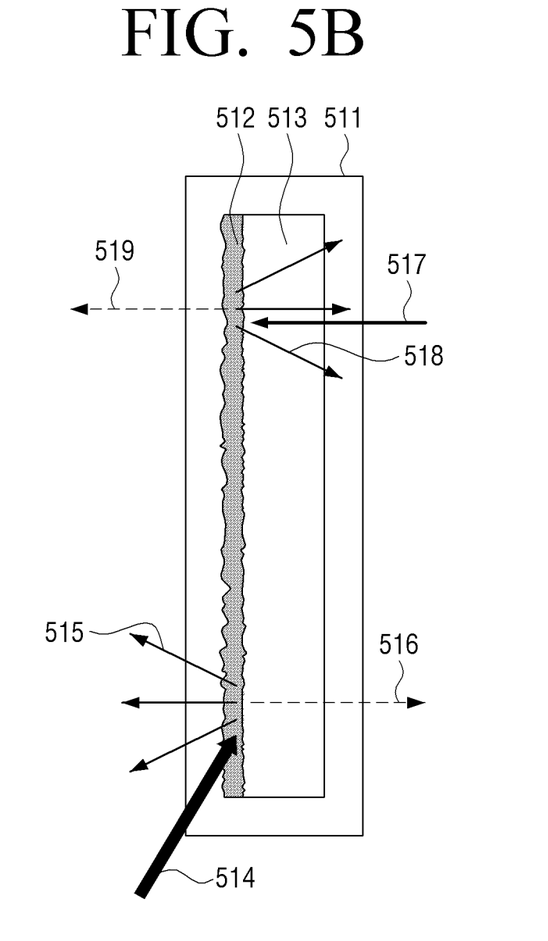

FIGS. 5A and 5B are diagrams illustrating a configuration of a transparent diffusion plate.

FIG. 5A is an example transparent diffusion plate 130 which is implemented as a diffuser 501 including a holographic optical element. Hereinbelow, a diffuser including a holographic optical element is referred to as a diffuser 501.

In general, a hologram is manufactured by projecting a reference beam together with an object beam onto a photosensitive material. The projected reference beam and the projected object beam may interfere with each other, and the generated interference pattern may be recorded on the photosensitive material. Thereafter, when a reference beam used for recording is projected onto a photosensitive material, an image of an object contained in the object beam may be reproduced.

The diffuser 501 may include a photoreactive material, that is, a holographic optical element, recorded by controlling a reference beam and a diffused light diffused from a normal diffusion plate to interfere with each other. When a reference beam is projected onto the diffuser 501, the reference beam is diffused like a light is diffused on a diffusion plate.

Referring to FIG. 5A, a projected light 502 containing image information in a frequency of the reference beam may be projected onto the diffuser 501. A light diffused on a diffusion plate is used as an object beam when the diffuser 501 is manufactured, and thus the projected light 502 may be diffused.

Meanwhile, a light 504 reflected from an external object has a different property from a reference beam and thus, a hologram principle is not applicable thereto. Accordingly, the light 504 directly penetrates a transparent diffuser 501.

Accordingly, when a reference beam containing image information is projected onto a projector, an image diffused from the diffuser 501 may be viewed along with the external object.

FIG. 5B is another example transparent diffusion plate 130, which is provided to explain a configuration of a transparent anisotropic diffuser 510. Hereinbelow, the transparent anisotropic diffuser will be referred to as a TAD 510.

An extremely thin metal layer 512 may be evaporated on an upper surface of an optical device 513 having a first refractive index. A refractive index alignment element 511 having the first refractive index may be manufactured to cover the metal layer 512. The projected light 514 and 517 are divided into a reflected and diffused light 515 and 518 and a penetration light 516 and 519.

The reflected and diffused light 515 and 518 may be formed by the inherent luster of metal, and the penetration light 516 and 519 may be formed because the metal layer is made extremely thin.

It will be assumed that a light 514 projected from a front surface part of the TAD 510 is a light by a projector and that a light 517 incident from a rear surface part is a light reflected from an external object. An intensity of radiation by the projector is significantly larger than that of the light reflected from an external object. Accordingly, a light 515 by a projector recognized by a user may appear to be a similar brightness to a light 519 by an external object.

For example, it will be assumed that a radiation intensity of a projector 514 is 100, that a radiation intensity 517 incident from an external background is 10, and that a reflectivity of a metal layer is 10%. In this case, an intensity of radiation 515 by a projector recognized by the user is 10 and an intensity of radiation incident from an external background is 9.

Accordingly, the user may simultaneously recognize an image by the projector and the external background.

Figure 6:
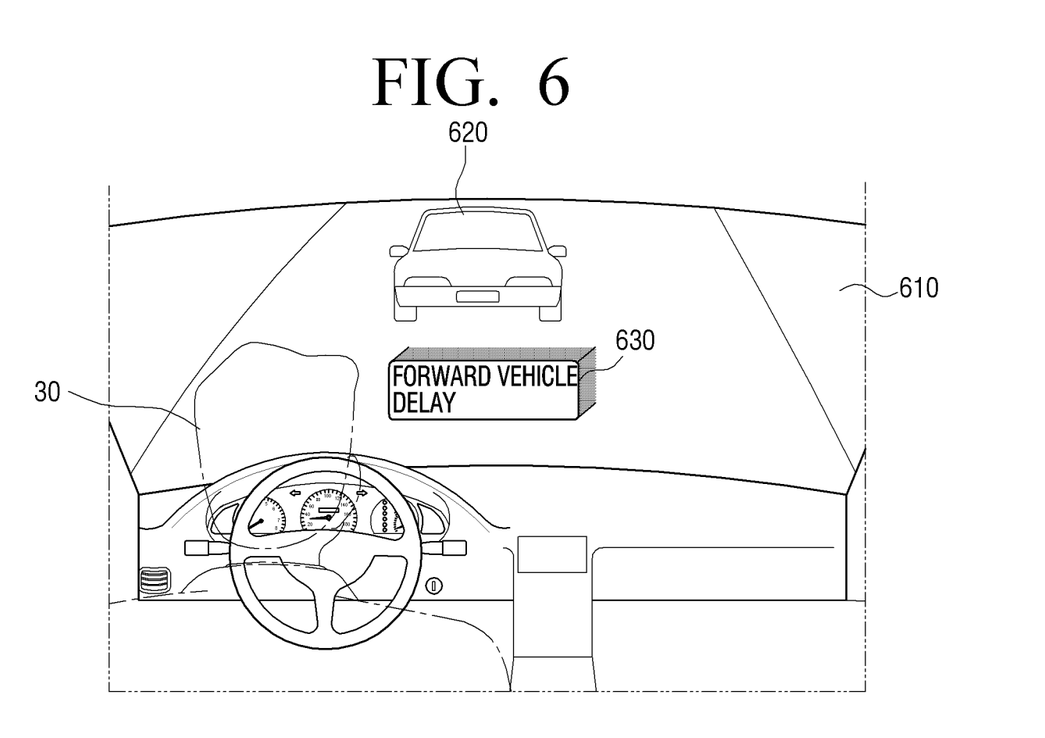
FIG. 6 is a diagram illustrating an operation of a display system which is applied to a front glass window of a vehicle, according to an example embodiment.

FIG. 6 is a diagram provided to explain a head-up display (HUD) to which a display system is applied, according to an example embodiment. FIG. 6 illustrates a state in which a front glass window 610 of a vehicle is implemented as a transparent panel 100 described with reference to FIGS. 1 and 2. A projector 200 may be disposed at a position from which an image is capable of being projected onto the front glass window 610 of the vehicle. For example, the projector 200 may be disposed on an upper part of a front dashboard of a vehicle, inside the dashboard or on the ceiling side, but is not limited thereto. In addition, only one projector 200 may be disposed on the front side of the driver's seat. However, according to an example embodiment, a plurality of projectors 200 may be dispersively disposed at various positions. The projector 200 is not illustrated in FIG. 6.

Referring to FIG. 6, the user 30 may observe a forward vehicle 62 of a current lane via the front glass window 610. From a terminal apparatus installed in a vehicle or a control system mounted on the vehicle, various information such as a current location of vehicle, road condition, surrounding situation, risk factor, vehicle speed, moving path, and the like may be obtained. The terminal apparatus or the control system may generate an image for expressing acquired information and project the generated image to a direction of the vehicle front glass window 610 through the projector 200.

As a result, the user 30 may recognize an external situation 610 together with an image 630. FIG. 6 illustrates a case where an image is applied to a front glass window, but it is possible that the image is applied to a side glass window or rear glass window.

Meanwhile, the remaining elements other than the transparent diffusion plate 130 may be omitted in a partial area of the vehicle glass window 610 in which a transparent panel 100 is implemented. In this case, a two-dimensional image may be reproduced in the partial area and a three-dimensional image may be reproduced in the remaining area. Since the lens 110, the ¼ wavelength plate 120 and the polarization plate 140 are excluded from the corresponding partial area, the partial area may show a higher transmittance than the remaining area.

Figure 7:
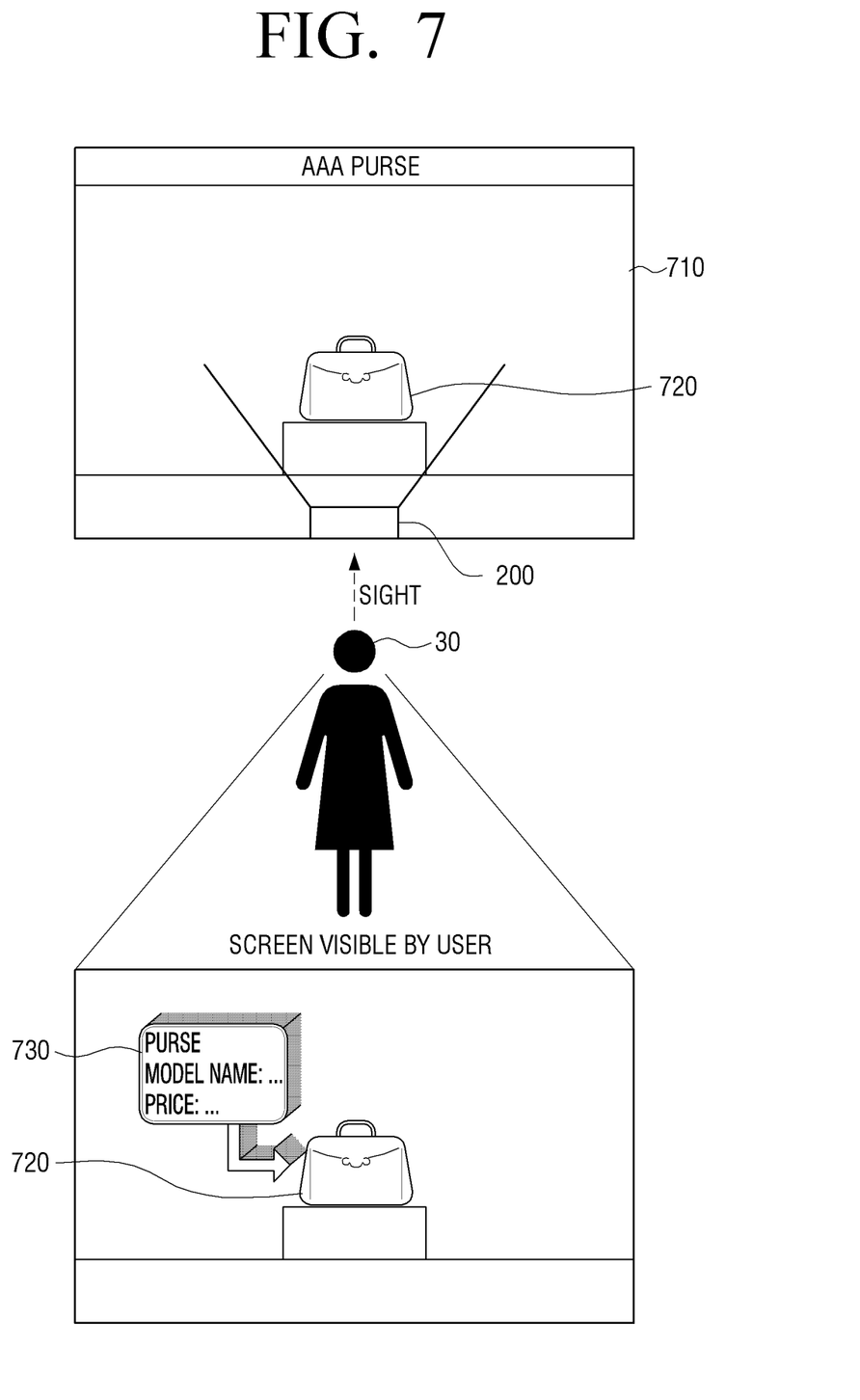
FIG. 7 is a diagram illustrating an operation of a display system which is applied to a show window of a store.

FIG. 7 is a diagram provided to explain a show window to which a display system is applied, according to an example embodiment.

Referring to FIG. 7, a user 30 may observe displayed goods 720 through a show window 710 to which a transparent panel 100 is applied. The information relating to the displayed goods may be projected by a projector 200 and viewed in a three-dimensional (3D) image 730.

Referring to FIG. 7, the projector 200 is installed at a bottom end part of the show window. However, the example is not limited thereto, and it may be installed at an upper end part or left and right sides of the show window. In addition, the elements other than the transparent diffusion plate 130 is omitted in a partial area of the show window 710 and thus, the user 30 may view a two-dimensional image together with the 3D image 730.

As described above, according to various example embodiments, it is possible to implement a small-sized display system and provide an image of high definition.

The foregoing embodiments and advantages are merely exemplary and are not to be construed as limiting the present disclosure. The present teaching can be readily applied to other types of apparatuses. Also, the description of the example embodiments is intended to be illustrative, and not to limit the scope of the claims, and many alternatives, modifications, and variations will be apparent to persons having ordinary skill in the art.

What is claimed is:

1. A transparent panel, comprising:
   a polarization plate;
   a transparent diffusion plate which is disposed on one side of the polarization plate and is configured to:
      transmit light incident from a side of the polarization plate, and
      reflect and diffuse a light incident from an opposite side of the polarization plate;
   a ¼ wavelength plate which is disposed on one side of the transparent diffusion plate and is configured to convert a polarization direction of an incident light; and
   a lens part which is disposed on one side of the ¼ wavelength plate,
   wherein the lens part comprises:
      a lens array comprising a birefringent material having different refractive indexes according to a polarization direction of an incident light, and
      a refractive index alignment member configured to transmit or refract the light according to a polarization direction of a light that penetrates the lens array.

2. The transparent panel as claimed in claim 1,
   wherein the lens array is a lenticular lens array, and
   wherein the refractive index alignment member is further configured to:
      include a material having a same refractive index as one of a plurality of refractive indexes of the birefringent material, and
      cover the lens array.

3. The transparent panel as claimed in claim 2,
   wherein the polarization plate is configured to convert a light incident to the polarization plate to a first polarized light,
   wherein the transparent diffusion plate is further configured to control the first polarized light to transmit the ¼ wavelength plate,
   wherein the ¼ wavelength plate is configured to:
      rotate a polarization direction of the first polarized light by 45 degrees, and
      convert the first polarized light to a second polarized light,
   wherein the lens part is further configured to transmit the second polarized light transferred from the ¼ wavelength plate,
   wherein the lens part is configured to, based on an image of a same polarization direction as the second polarized light being incident from an external projector, control the image to transmit the ¼ wavelength plate,
   wherein the ¼ wavelength plate is further configured to:
      rotate a polarization direction of the image by 45 degrees, and
      transmit the image to the transparent diffusion plate,
   wherein the transparent diffusion plate is further configured to reflect the image to the ¼ wavelength plate,
   wherein the ¼ wavelength plate is further configured to:
      rotate a polarization direction of the reflected image by 45 degrees again, and
      convert a polarization direction of the image to a perpendicular polarization direction to the second polarized light, and wherein the lens part refracts an image of a perpendicular polarization direction to the second polarized light.

4. The transparent panel as claimed in claim 1, wherein the transparent diffusion plate comprises:
   an optical device of a first refractive index,
   a metal layer of a second refractive index and disposed on one side of the optical device, and
   a refractive index alignment device of the first refractive index and covering the metal layer, and
   wherein the metal layer is thinner than the optical device and the refractive index alignment device.

5. A display system, comprising:
   a transparent panel; and
   a projector configured to project an image to a direction of a first surface of the transparent panel,
   wherein the transparent panel comprises:
      a polarization plate which is disposed on a position corresponding to a second surface of the transparent panel opposite to the first surface of the transparent panel,
      a transparent diffusion plate which is disposed on one side of the polarization plate, and is configured to:
         transmit a light incident from a side of the polarization plate, and
         reflect and diffuse a light projected from an opposite side,
      a ¼ wavelength plate which is disposed on one side of the transparent diffusion plate and is configured to convert a polarization direction of an incident light, and
      a lens part which is disposed on one side of the ¼ wavelength plate, and
   wherein the lens part comprises:
      a lens array comprising a birefringent material having different refractive indexes according to a polarization direction of an incident light, and
      a refractive index alignment member configured to transmit or refract the light according to a polarization direction of a light that penetrates the lens array.

6. The display system as claimed in claim 5, wherein the lens array is a lenticular lens array, and
   wherein the refractive index alignment member is further configured to:
      include a material having a same refractive index as one of a plurality of refractive indexes of the birefringent material, and
      cover the lens array.

7. The display system as claimed in claim 6, wherein the polarization plate is configured to convert a light incident to the polarization plate to a first polarized light,
   wherein the transparent diffusion plate is further configured to control the first polarized light to transmit the ¼ wavelength plate,
   wherein the ¼ wavelength plate is further configured to:
      rotate a polarization direction of the first polarized light by 45 degrees, and
      convert the first polarized light to a second polarized light,
   wherein the lens part is configured to transmit the second polarized light transferred from the ¼ wavelength plate,
   wherein the lens part is configured to, based on an image of a same polarization direction as the second polarized light being incident from the projector, control the image to transmit the ¼ wavelength plate,
   wherein the ¼ wavelength plate is further configured to:
      rotate a polarization direction of the image by 45 degrees, and
      transmit the image to the transparent diffusion plate,
   wherein the transparent diffusion plate is further configured to reflect the image to the ¼ wavelength plate,
   wherein the ¼ wavelength plate is further configured to:
      rotate a polarization direction of the reflected image by 45 degrees again, and
      convert a polarization direction of the image to a perpendicular polarization direction to the second polarized light, and
   wherein the lens part refracts an image of a perpendicular polarization direction to the second polarized light.

8. The display system as claimed in claim 7, wherein the projector comprises: an image projection part configured to project the image; and a polarizer configured to convert light of the projected image to a second polarized light.

9. The transparent panel as claimed in claim 5, wherein the transparent diffusion plate comprises:
   an optical device of a first refractive index,
   a metal layer of a second refractive index and disposed on one side of the optical device, and
   a refractive index alignment device of the first refractive index and covering the metal layer, and
   wherein the metal layer is thinner than the optical device and the refractive index alignment device.

* * * * *